United States Patent [19]

Price

[11] Patent Number: 4,822,088

[45] Date of Patent: Apr. 18, 1989

[54] WEED PULLER

[76] Inventor: Chester Price, 300 Chelsea St. (P.O. Box 279), Forked River, N.J. 08731

[21] Appl. No.: 210,925

[22] Filed: Jun. 24, 1988

[51] Int. Cl.⁴ .............................................. A01B 1/16
[52] U.S. Cl. .................................... 294/50.7; 294/50
[58] Field of Search ...................... 294/50, 50.5, 50.7; 30/130; 111/92, 96, 99; 172/19, 21, 22; 175/20; 254/132

[56] References Cited

U.S. PATENT DOCUMENTS

| | | | |
|---|---|---|---|
| 554,139 | 2/1896 | Ober | 294/50.7 X |
| 1,225,188 | 5/1917 | Smith | 294/50.7 X |
| 1,548,865 | 8/1925 | Bull | 294/50.7 X |
| 1,692,436 | 11/1928 | Deane | 294/50.5 X |
| 3,152,788 | 10/1964 | Hardwidge | 254/132 |
| 3,210,112 | 10/1965 | Glynn | 294/50.7 |
| 3,444,938 | 5/1969 | Ballmann | 294/50.7 X |

FOREIGN PATENT DOCUMENTS

| | | | |
|---|---|---|---|
| 598340 | 6/1934 | Fed. Rep. of Germany | 294/50.5 |
| 127864 | 4/1950 | Sweden | 294/50.7 |
| 638898 | 6/1950 | United Kingdom | 294/50.7 |

*Primary Examiner*—Johnny D. Cherry

[57] ABSTRACT

A weed puller of telescopic tubes, the outer tube having one end engageable with a ground surface for surrounding a weed, the inner tube being held retracted and an ejector resiliently held retracted and releasable to eject the weed.

8 Claims, 5 Drawing Sheets

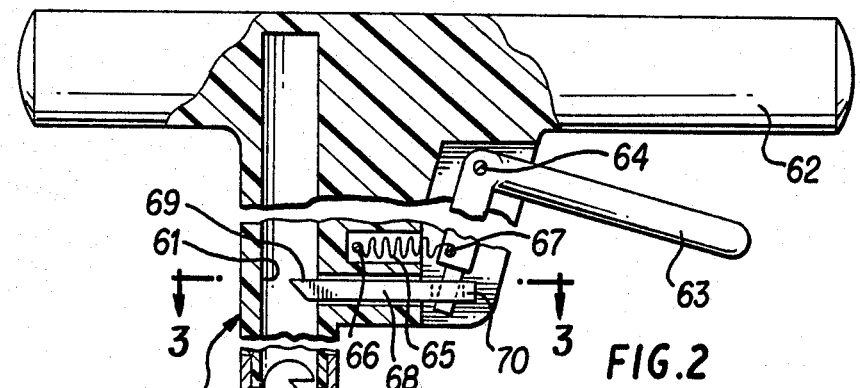
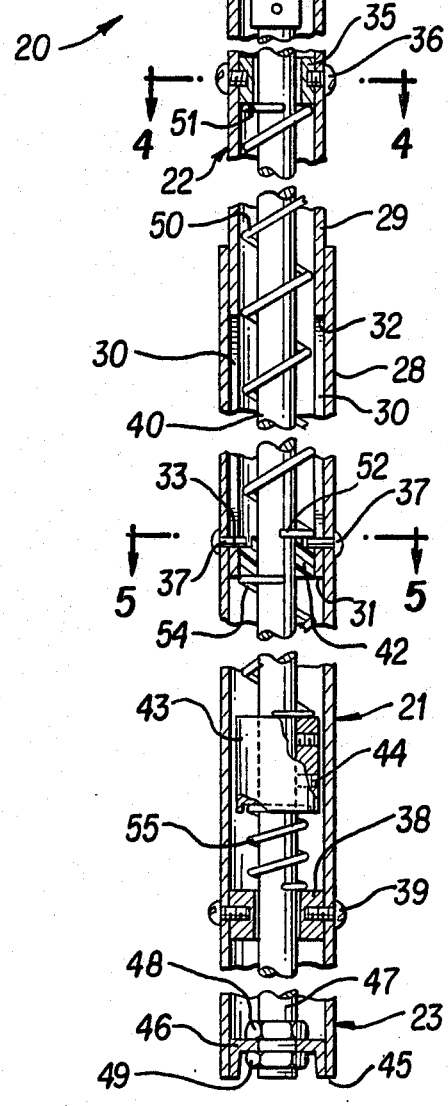
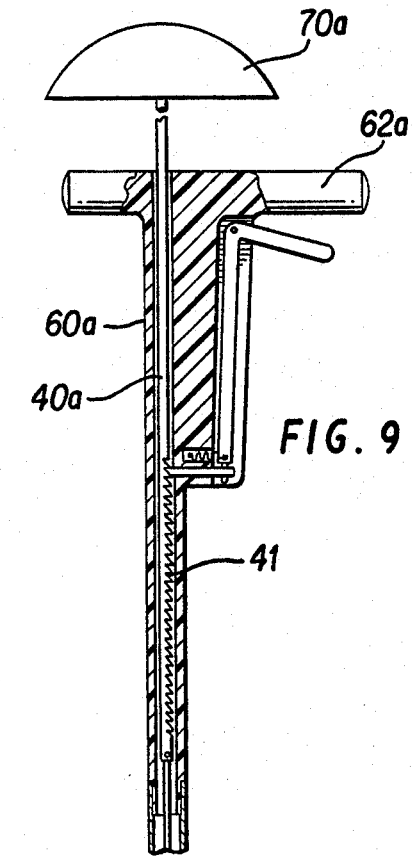
FIG. 2
FIG. 9

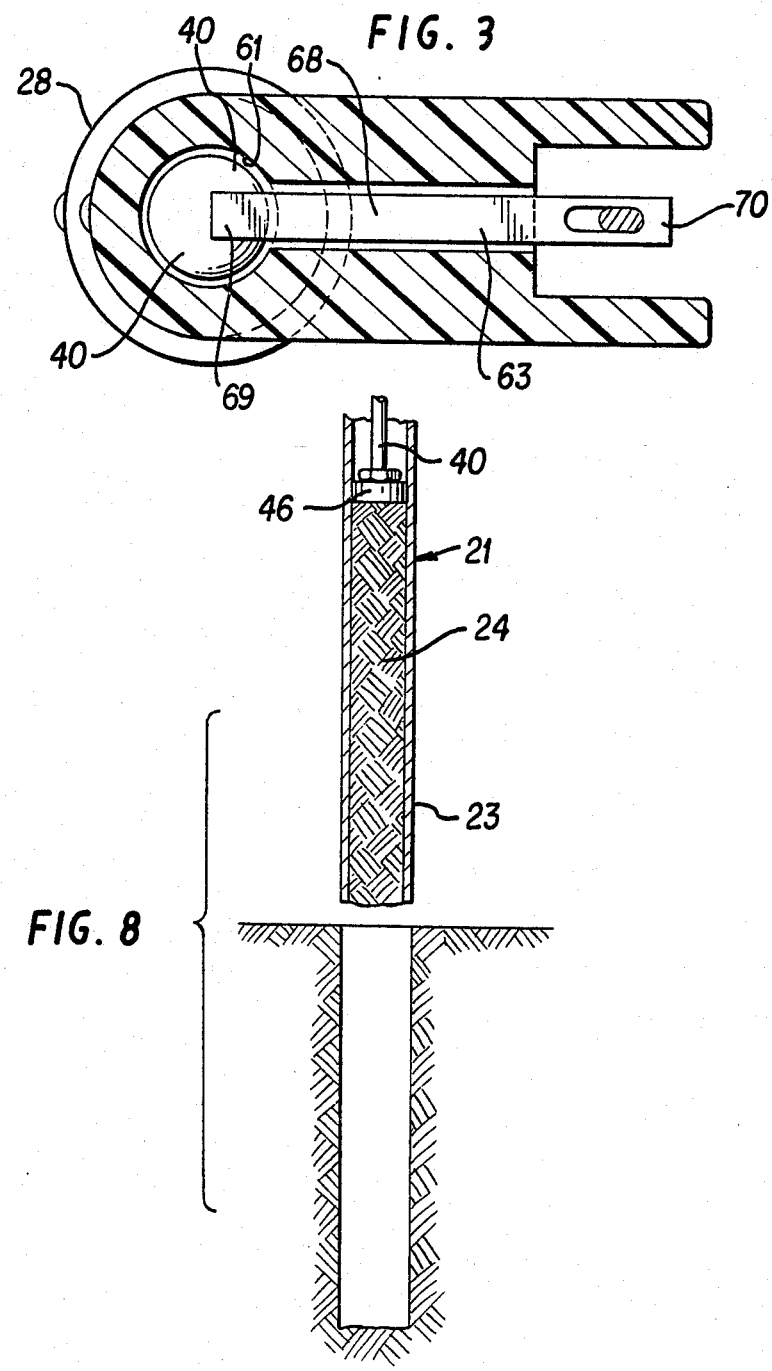

WEED PULLER

BACKGROUND OF THE INVENTION

Applicant is aware of the below listed prior patents in the general field of weed pullers:

| REGISTRATION NO. | NAME |
| --- | --- |
| 287,677 | Higinbotham & Ball |
| 1,262,170 | Bussell |
| 1,226,980 | Linse |
| 1,539,088 | Jones |
| 1,640,732 | Simpson |
| 2,185,552 | Hecox |
| 2,532,115 | McKinney |

However, the prior patents do not provide the simplicity of operation wherein a weed plug is quickly and easily removed from the ground, and releasably held by the puller for convenient disposition at a selected location by remote weed puller operation.

SUMMARY OF THE INVENTION

It is an important object of the present invention to provide a weed puller of the type described wherein the weed plug remains under control of the operator throughout the operation.

More specifically, the weed plug is retained in the weed puller, protected by an extensile tube, until the operator presses a release lever, at which time the weed plug is ejected to a receptacle, as desired.

BRIEF DESCRIPTION OF THE DRAWINGS

FIG. 2 is a longitudinal sectional view showing the weed puller of FIG. 1, but in section to show internal construction and broken away for conservation of space.

FIG. 3 is a transverse sectional view taken generally along the line 3—3 of FIG. 2.

FIG. 4 is a transverse sectional view taken generally along the line 4—4 of FIG. 2.

FIG. 5 is a sectional view taken generally along the line 5—5 of FIG. 2 and partly broken away.

FIG. 6b is a longitudinal sectional view showing the lower half of the weed puller in the condition of FIG. 6a.

FIG. 7b shows the lower end of the weed puller in the condition of FIG. 7a.

FIG. 8 is a partial longitudinal sectional view showing the weed puller removing a plug of soil.

FIG. 9 is a partial sectional elevational view showing a slightly modified construction in accordance with the teachings of the present invention.

DESCRIPTION OF THE PREFERRED EMBODIMENTS

Figure 1:
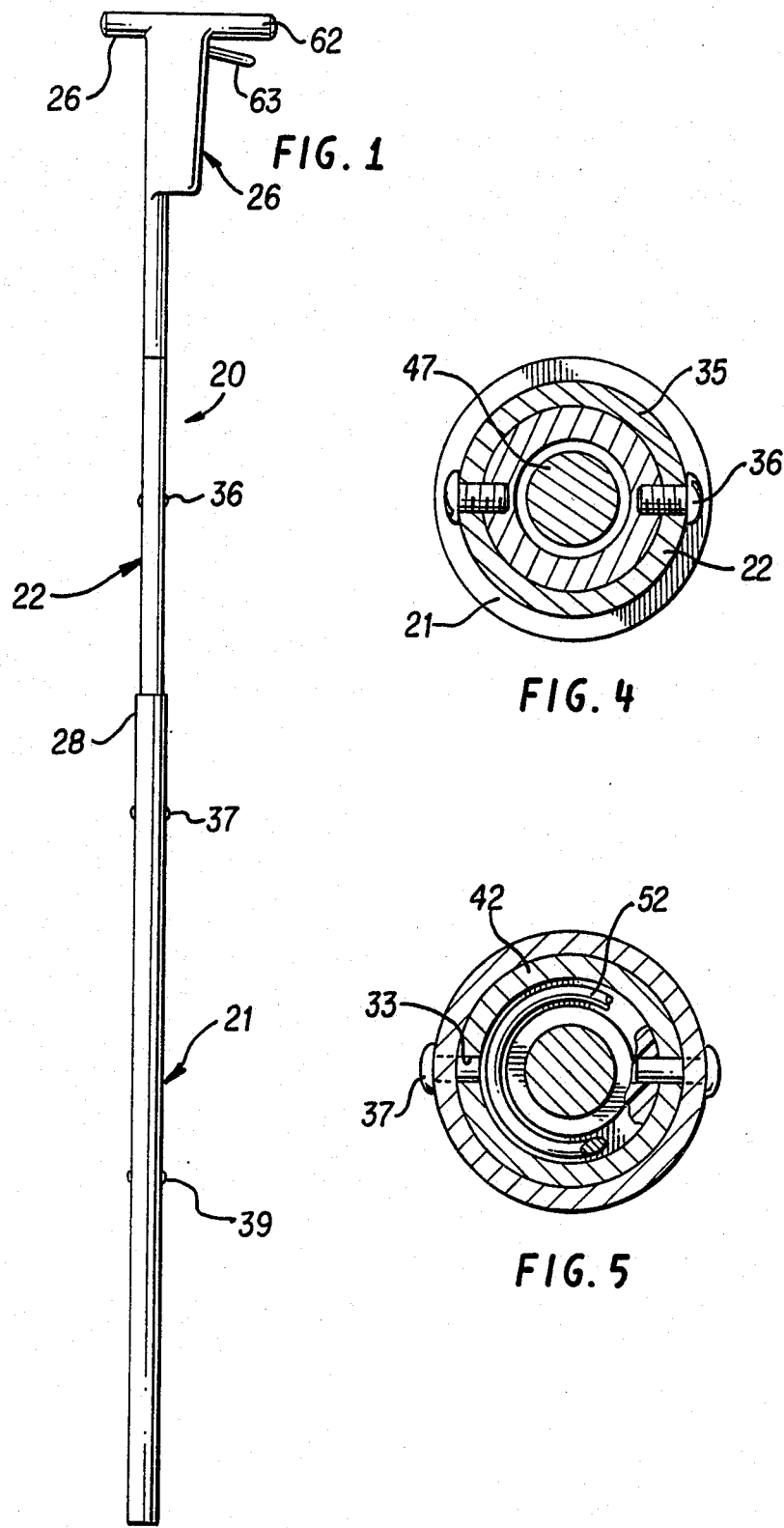
FIG. 1 is a side elevational view showing the upper or handle end of a weed puller of the present invention.
Figure 6A:
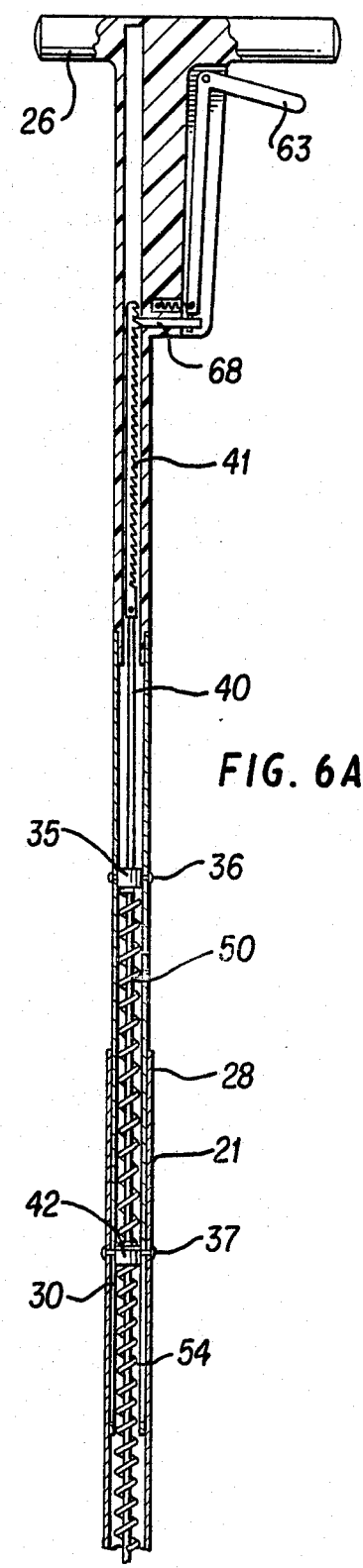
FIG. 6a is a longitudinal sectional view showing the upper part of the weed puller in a partially retracted condition.
Figure 7A:
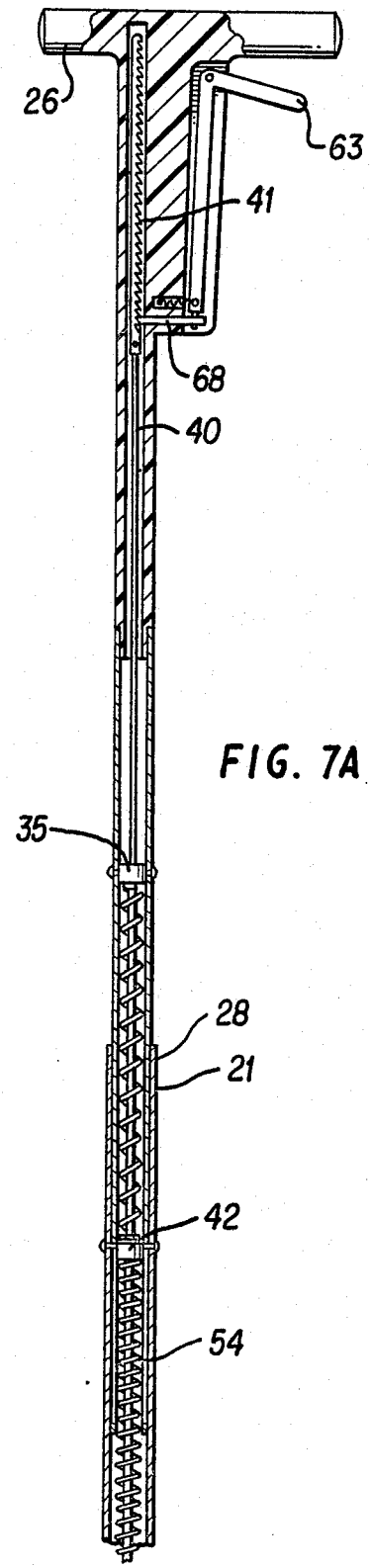
FIG. 7a is a longitudinal sectional view showing the weed puller in an initial ground engaging position.
Figure 6B:
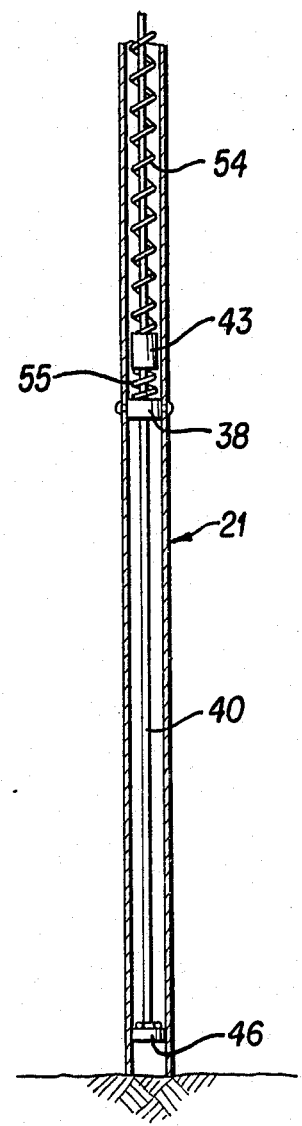
Figure 7B:
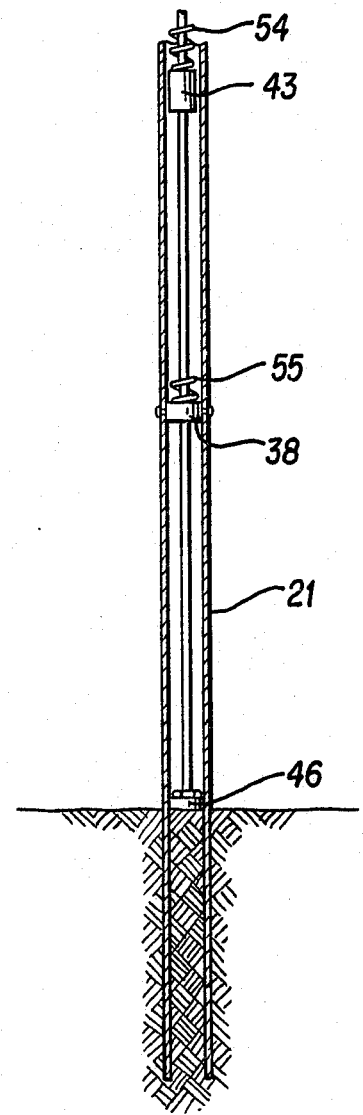

Referring now more particularly to the drawings, and specifically to FIG. 1 thereof, a weed puller is there generally designated 20, including a pair of outer and inner telescopic members or tubes 21 and 22, the former having its lower end portion 23 for engagement with a ground surface to receive a soil plug 24, see FIG. 8.

On the upper end of the inner member 22 is a hand grip or handle 26.

Referring now more particularly to FIG. 2, the lower outer sheath 21 is shown, see FIG. 2, with its upper portion 28 telescopically or slidably receiving through its upper end the lower portion 29 of the upper or inner tube 22.

The inner or upper tube 22 has its lower portion 29 provided with slots 30 extending longitudinally of the lower tube portion 29 in diametrically opposed relation.

More specifically, adjacent to and spaced above the lower end 31 of the upper, inner tube 22, there are formed diametrically opposed elongate slots 30, each having an upper closed end 32, and a lower closed end 33.

Fixed in the inner, upper tube 22, adjacent to and spaced below its upper end is an annular abutment, collar or ring 35. The annular abutment 35 is secured interiorly of the tube 22, spaced above the slot 30, and may be fixed in the tube by fasteners 36, or otherwise as desired.

The lower or outer tube 21 is provided with internal lugs, stops or fasteners, such as the pins 37 fixed in diametrically opposed inwardly extending relation for passage inwardly through and beyond the slots 30. Thus, the pins or lugs 37 provide means limiting the telescopic extension of tubes 21 and 22 by abutting engagement of the pins with the ends of slots 30, the condition shown in FIG. 2.

Additionally, the lower or outer tube 21 is provided toward its lower end with an internally fixed abutment or collar 38, suitably secured extending about the interior of tube 21, as by fasteners 39, or other fastener means.

A relatively rigid, elongate member or rod 40 extends spacedly within the telescopic tubes 21 and 22 for longitudinal sliding movement therein. In practice, the rod 40 is generally coaxially of and within the tubes 21 and 22, and actually slidable therein, as will appear presently. On one end, the upper end adjacent to the handle 26, the rod 40 may be provided with a series of laterally facing teeth or ratchet members, as at 41. In the lower end of the tube portion 29, located approximate to the lower end 33 of slot 30, there is an annular plug 42 fixed in the tube portion 29, as by fasteners 37, and slidably guiding the rod longitudinally within the tubes.

Spaced below the annular guide 42, on the rod 40, is a ring or collar 43, which may be secured to the rod by any suitable means, such as fasteners 44.

Also secured to the rod 40, but at the lower end thereof, adjacent to the open, ground engageable end 45 of the tube 21, is a piston or plunger 46 carried on the lower end 47 of the rod, as between nuts 48 and 49.

In addition, a resiliently yieldable member or coil compression spring 50 is circumposed about the rod 40 within the inner, upper tube 22. The coil compression spring has an upper end 51 in bearing engagement with the plug 35, and has a lower end 52 in bearing engagement with at least one of the pins 37. Thus, the coil compression spring 50 serves to urge the outer tube 21 downwardly and outwardly relative to the inner tube 22, to locate the pins 37 at their limiting position shown in FIG. 2.

An additional coil compression spring, which is of less strength than spring 50, is shown at 54, having one end, the upper end as seen in FIG. 2, in abutting engagement with the fixed abutment 42, and the other end in downward abutting engagement with the collar 43. Also, to yieldably maintain the rod 40 and tubes 21 and 22 in resiliently yieldable position, as shown in FIG. 2, an additional coil compression spring 55 is interposed between the fixed shoulder 38 and the collar 43.

Considering now the handle 26, which may be fixed to and extend transversely across the upper end of inner tube 22, the handle includes an inner bore or passageway 61 which provides a receiver for the upper toothed end 41 of the rod 40. The handle 26 may include a transverse pistol grip 62 carrying an angled trigger 63 pivoted at 64 to the handle. The actuator or trigger 63 is resiliently biased clockwise, as by a tension spring 65 connected between the handle and trigger, as by connections 66 and 67.

An elongate member or pawl 68 is mounted slidably in the handle 26, extending transversely of the bore 61, and having one end 69 projecting into the bore. The other end 70 of the ratchet element, pawl or holder is loosely connected to the trigger arm 63 for retraction of the pawl out of the bore 61 upon squeezing of the trigger 63.

The end 69 of holder or pawl 68 is configured for ratcheting engagement with the teeth 44 of rod 40. That is the teeth 41 are retractable with the rod 40 for interengagement with the pawl 68; and, the trigger 63 is retractable to release the rod end 41 from the pawl 68.

In operation, the weed puller 20 has its lower end 45 engaged to receive a weed plug. On downward pressure applied to the weed puller 20, the outer tube is shiftable upwardly to compress yieldable element or spring 50, and simultaneously ratchet the rod teeth 41 upwardly passed the pawl 68 for holding engagement by the pawl. That is, the outer tube 21 telescopes over the inner tube 22, and upon continued downward ground engaging pressure the holding pawl 68 interengages with the ratchet teeth 41 to retain the rod retracted. Upon removal of the weed puller from the ground, the outer tube 21 extends resiliently outwardly, and the weed plug is retained until ejected by operation of the trigger 63 to release the rod 40.

In FIG. 9 is shown a slightly modified embodiment wherein a handle 60a includes a transverse grip 62a, and a rod 40a, corresponding to rod 40, extends upwardly and outwardly through the hand grip 62a. On the upper end of the rod 40a is a manually actuable element or hand push 70a to add effective force to the rod as in difficult ground.

Although the present invention has been described in some detail by way of illustration and example for purposes of clarity of understanding, it is understood that certain changes and modifications may be made within the spirit of the invention.

What is claimed is:

1. A weed puller comprising a first tube having one end engageable with a ground surface, a second tube having one end telescoping into the other end of said first tube and terminating short of the ground engageable end of said first tube a handle on the other end of said second tube, an elongate member extending longitudinally within said telescopic tubes between the distal ends thereof, releasable interfitting holding means on said elongate member and handle, first resilient means urging said first tube to extend said one end thereof outwardly to a limiting position away from said second tube, second resilient means urging said elongate member toward an intermediate position of its movement relative to said first tube, whereby ground pressure applied to said one end of said first tube telescopes said tubes to compress said first resilient means and compress said second resilient means to shift said holding means into a releasable interfitting engagement, removal of ground pressure enabling extension of said first tube beyond said second tube, release of said holding means relative to said elongate member under the influence of said second resilient means expelling contents from said ground engageable first tube end.

2. A weed puller according to claim 1, said elongate member comprising a rod, and said first and second tubes comprising outer and inner tubes, respectively, said inner tube extending beyond said outer tube to said handle, and said outer tube having its ground engageable end extending beyond said inner tube.

3. A weed puller according to claim 2, in combination with stop means on said first and second tubes to limit extension and retraction of said outer tube relative to said inner tube.

4. A weed puller according to claim 3, said first resilient means comprising a coil compression spring having its opposite ends in bearing relation with said first and second tubes to urge the former with its ground engageable end extending.

5. A weed puller according to claim 1, in combination with an extension on said rod beyond said handle, and a hand pusher on said extension for adding force to said rod.

6. A weed puller according to claim 1, said holding means comprising interfitting tooth formations.

7. A weed puller according to claim 1, said holding means comprising a ratchet for releasably entering in one direction of relative tube movement and holding in the other direction of relative tube movement.

8. A weed puller according to claim 1, in combination with stop means on said first and second tubes to limit extension and retraction of said outer tube relative to said inner tube, said first resilient means urging said first tube to its limiting position of said relative extension.

* * * * *